Dec. 6, 1966   R. H. BETEILLE   3,290,681
DEVICE FOR JAMMING RADAR DETECTION AND
INTERCEPTION OF BALLISTIC MISSILES
Filed March 10, 1964   4 Sheets-Sheet 1

Dec. 6, 1966    R. H. BETEILLE    3,290,681
DEVICE FOR JAMMING RADAR DETECTION AND
INTERCEPTION OF BALLISTIC MISSILES
Filed March 10, 1964    4 Sheets-Sheet 2

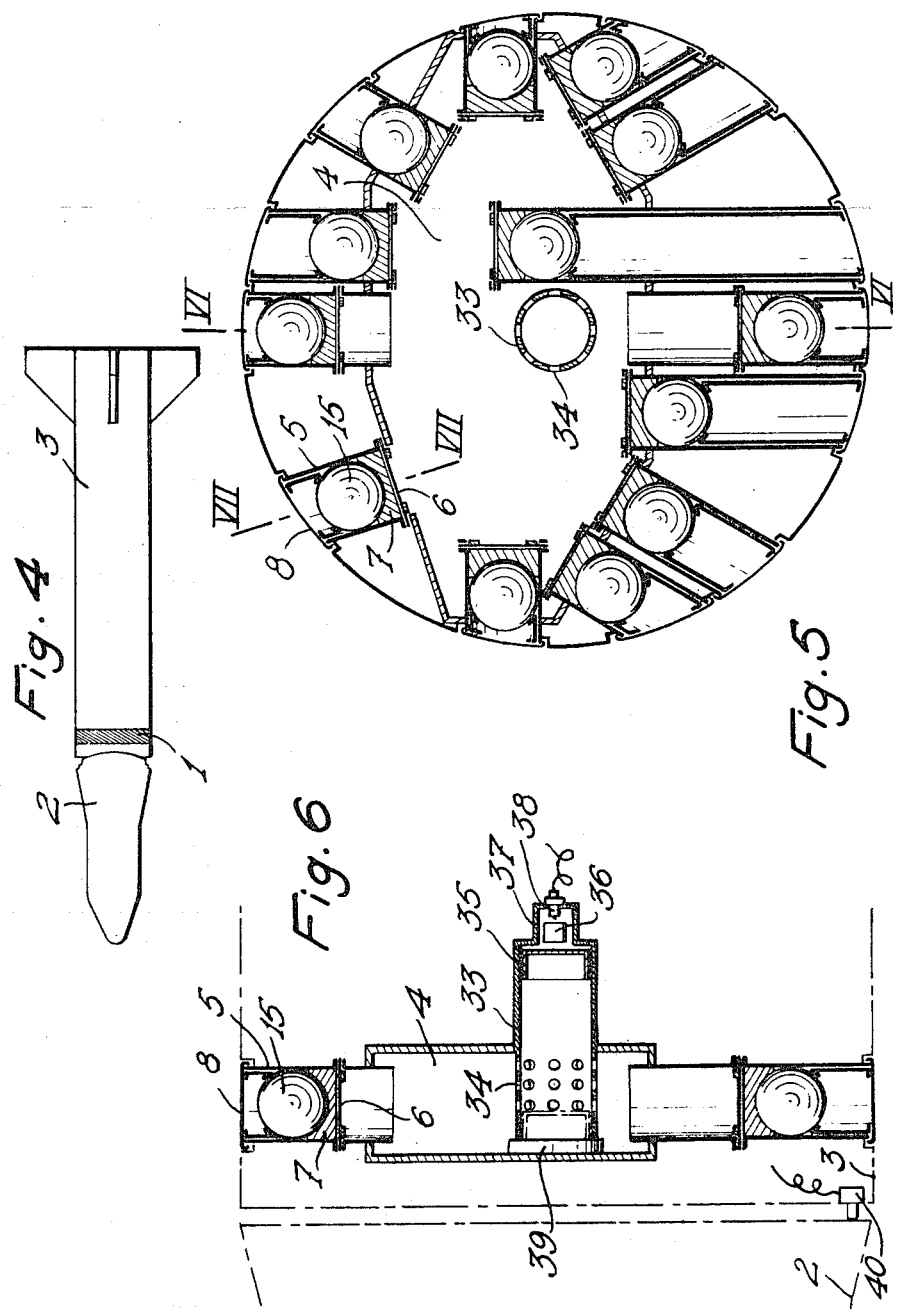

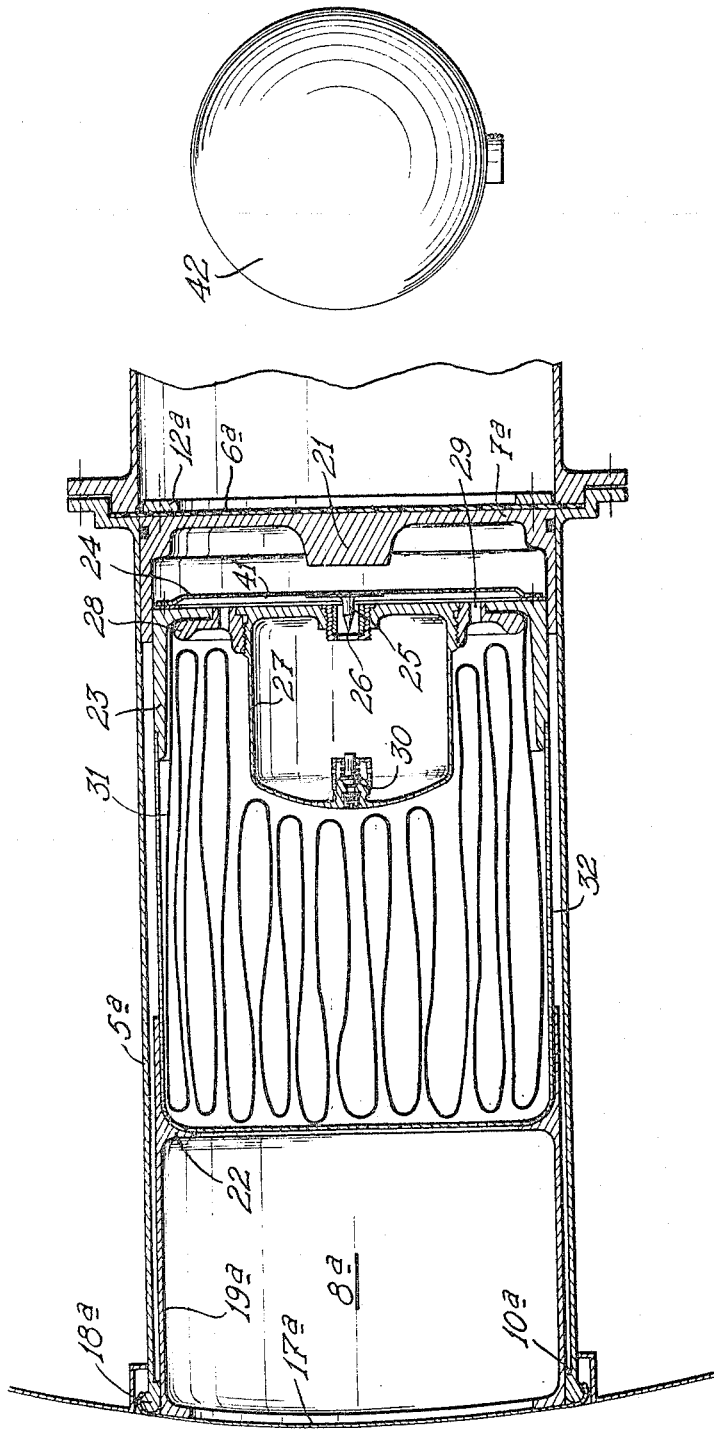

United States Patent Office 3,290,681
Patented Dec. 6, 1966

3,290,681
DEVICE FOR JAMMING RADAR DETECTION AND INTERCEPTION OF BALLISTIC MISSILES
Roger Henri Beteille, La Napoule, France, assignor to Sud-Aviation Societe Nationale de Constructions Aeronautiques, Paris, France
Filed Mar. 10, 1964, Ser. No. 350,846
Claims priority, application France, Mar. 11, 1963, 927,486
10 Claims. (Cl. 343—18)

In order to reduce the chances of enemy detection and interception of aircraft, projectiles or ballistic missiles, attempts have been made at jamming the radar images obtained by the enemy by releasing metallized strips or filaments while in flight. Unfortunately, however, the images provided thereby can easily be distinguished from that of the flying object to be protected.

This invention has for its object to prevent enemy detection, more particularly by radar, and to avoid the issuing of an interception command against a ballistic missile, especially through the use of a tracking radar, and accordingly comprises a jamming method whereby radar images identical to but distinct from that of the missile are generated as soon as the missile becomes radar-detectable.

In a preferred mode of performance of this invention, the missile is provided, prior to launching, with a multiplicity of decoys having a radar reflective area and reflected-wave-polarization and flicker characteristics equivalent to those of the missile when it enters the interception zone, which decoys are ejected to fan out around the missile in a plane perpendicular to the rising part of the missile trajectory and their individual ejection speeds, directions and mutual positions in said plane are so determined as to cause said decoys to be clustered together within an area very close to the missile when the same enters the interception zone yet to provide radar images which are similar to but distinct from that of the missile. The enemy thus has great difficulty in discriminating between the decoy trajectories and the true missile trajectory, resulting in greatly reduced chances of enemy interception of the missile.

The ejection speed and direction characteristics are determined in such manner that, when penetration into the interception zone occurs, the distance between any given decoy and the missile and between any two decoys is equal to at least twice the effective destruction radius of the armament or explosive charge carried by the intercepting device. This ensures that the destruction of any single decoy by the interceptor cannot result in destruction of the missile, and also that no two decoys can be destroyed simultaneously, thereby increasing the effectiveness of the system in the event of simultaneous interception by several interceptors.

In cases where the missile is equipped with a detachable warhead designed to follow a ballistic trajectory, ejection of the decoys is preferably effected when the warhead separates from the booster rocket.

It is a further object of the invention to provide an apparatus for performing the results hereinbefore specified, which apparatus comprises, within a section of the missile located aft to the warhead, a tight central chamber about which are disposed ejection tubes of different length and orientation which have port externally of the missile and which are sealed, at their chamber ends, by shearing diaphragms rigid with pistons slidably mounted in said tubes and, at their outer ends, by closure means flush with the outer surface of the rocket casing, said pistons and closure means having said decoys retained therebetween, which decoys are ejected by an explosive device which pressurizes said central chamber, and each tube comprising means for restraining its associated piston after ejection.

The gas produced by the explosive device in the central chamber causes the decoys to be ejected by the piston after the diaphragm has been sheared, distribution of the decoys being ensured vectorially by the orientation of the tubes and speedwise by the distance along which the pistons are guided therein.

The decoys preferably consist of radar-wave reflecting bodies of relatively low weight, an example being metallized inflatable balloons or Luneberg lenses.

Where a decoy consists of a metallized inflatable balloon, the deflated and folded envelope thereof is connected to a compressed gas capsule and accommodated therewith between the corresponding piston and closure, said capsule being provided with means sensitive to the pressure prevailing in the central chamber whereby to be placed in communication with the space bounded by said envelope when ejection is to take place.

Where a decoy consists of a Luneberg lens, whether weighted or not, the lens ejection piston is provided with means for setting the lens in rotation whereby to ensure maximum radar reflectiveness, which requires that said lens be spin-stabilized.

The description which follows with reference to the accompanying non-limitative exemplary drawings will give a clear understanding of how the invention can be carried into practice and will disclose other advantageous features thereof.

In the drawings:

FIG. 4 shows schematically a missile with ballistic warhead, according to the present invention;

FIG. 5 is a diametrical sectional view on an enlarged scale of the missile of FIG. 4, taken through the rocket casing section accommodating the decoys, which decoys are represented herein as being Luneberg lenses;

FIG. 6 is a section taken through the line VI—VI of FIG. 5;

FIG. 8 is a sectional view similar to that of FIG. 7, illustrating the use of metallized inflatable balloons for the decoys; and FIG. 9 shows on a smaller scale a metallized inflatable balloon subsequent to ejection thereof.

While the drawings show, for illustrative purposes, the invention as it is applied to an intermediate-range ballistic missile (hereinafter referred to as an "IRBM"), it will of course be manifest that the invention is applicable also to an intercontinental ballistic missile (hereinafter referred to as an "ICBM").

Figure 1:
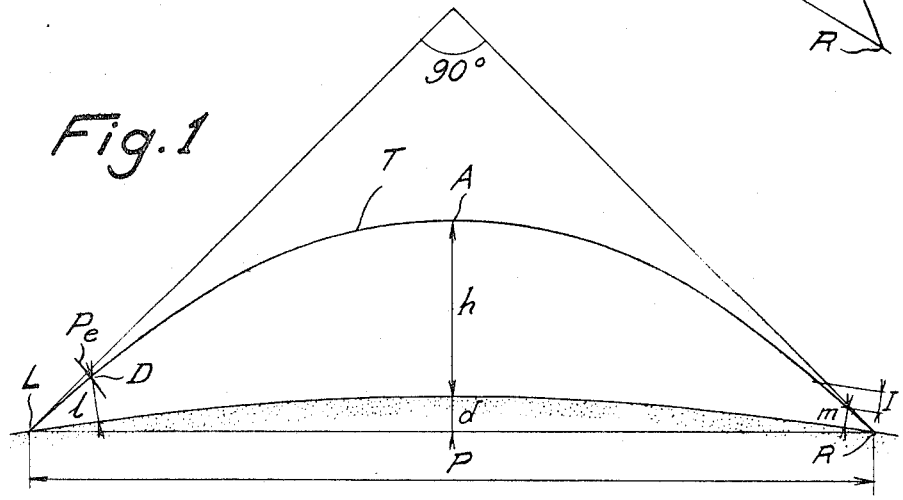
FIG. 1 is an approximate representation of the trajectory of an IRBM.

For illustrative purposes the accompanying exemplary drawings will refer more specifically to the case of an IRBM with detachable warhead having a range P of, say, 1800 km. (see FIG. 1) and launched from a point L at an elevation angle of 45°. It parabolic trajectory T up to the theoretical point of impact R has an apogee A whose vertical distance above the earth is $h$ and absolute magnitude relative to the launch point is $d+h$, where $h$ and $d$ are in this specific case respectively equal to 380 and 70 km., indeed. The warhead separates from the booster at a point P, at an altitude $l$ of, say, 100 km., and penetrates into the interception zone I which is located at a height $m$ of, for instance, 40 km. above the earth. The tangents to the trajectory taken at the points of booster burn-out and entry into the interception zone intersect substantially at right angles.

In order to avoid radar detection and an interception command from a tracking radar, the missile is provided with means for emitting radar images identical to but distinct from those of the warhead.

Accordingly, in a section 1 of the rocket casing located aft of the warhead 2 and comprised within the portion 3 of the casing containing the rocket motors (FIG. 4) is disposed a tight central chamber 4 (see FIGS. 5 and 6) about which are mounted ejection tubes 5 of different length and orientation but whose axes are substantially orthogonal to the fore-aft axis of the missile. Each of these tubes is sealed at the chamber end by a shearing diaphragm 6 rigidly connected to a piston 7 and at its outer end by a closure 8 the outer wall of which is flush with the outer surface of the rocket casing.

Figure 7:
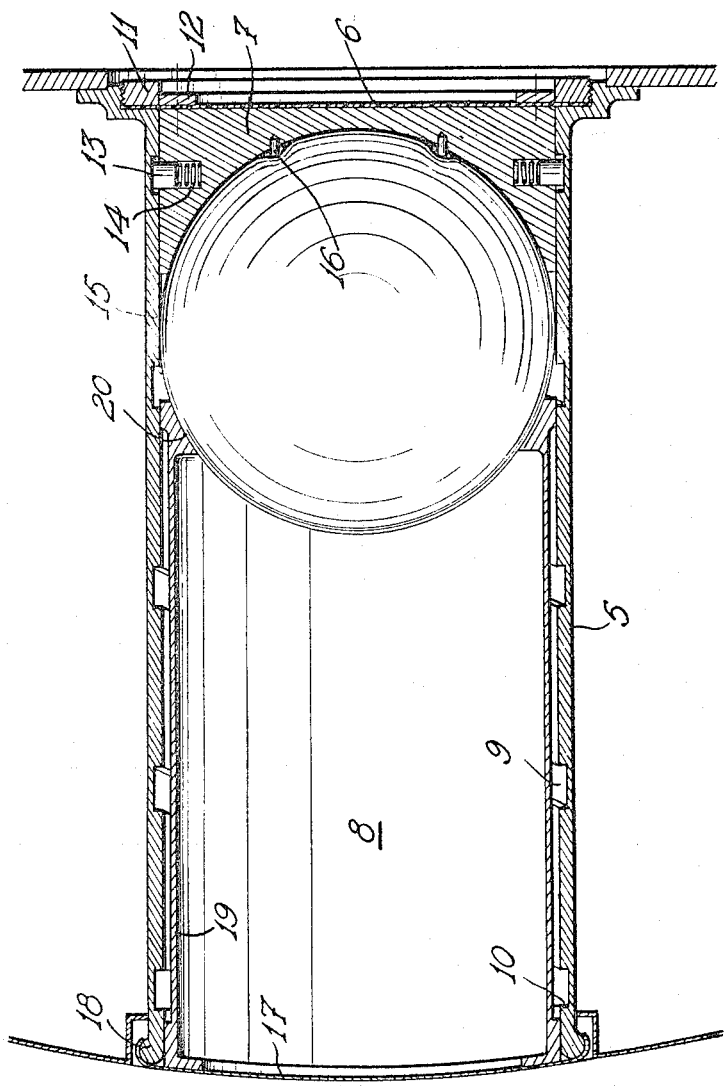
FIG. 7 is a fragmental section, on an enlarged scale, taken through the line VII—VII of FIG. 5.

Within the tube 5, between each piston 7 and the corresponding closure 8, is mounted a decoy having a radar reflective area and reflected-wave polarization and flicker characteristics equivalent to those of the warhead when the latter penetrates into the interception zone I. As shown in FIGS. 5 to 7, such decoys may take the form of Luneberg lenses having an electronically reflective hemispherical surface or, as shown in FIGS. 8 and 9, of inflatable balloons having a completely metallized surface. Preferably, the Luneberg lenses have a diameter of 15 cm. and the metallized inflatable balloon a diameter of 1 m. after inflation, the weight of the decoy being in each case approximately 1.5 kg.

In the specific form of embodiment shown in FIG. 7 which relates to a Luneberg lens type of decoy, the ejection tube 5 embodies internal spiral riflings 9 terminating in abutments 10 at the outer extremity of the tube. The shearing diaphragm 6 is retained on the tube by a keeper-ring 11 and secured to the piston 7 by screws extending through a washer 12. The piston is provided with captive studs 13 which are spring-loaded by a spring 14 and engage into the spiral riflings 9. The piston bears in addition means for imparting spin to the Luneberg lens as it advances through the tube 5. Such means may take the form of small pegs 16 or surface roughnesses for causing local distortions or deformations of the lens, which lens bears against the piston 7 by its reflective hemispherical surface which is centered upon the axis of the ejection tube 5. The closure 8 consists of an outer wall 17 made of thin material, which engages over an outer ridge or the like 18 of tube 5 and which is rigidly connected to an extension piece 19 whose inward extremity 20 is spherically surfaced to match the Luneberg lens 15 and act as a rest point therefor.

In the specific case where each decoy consists of a metallized inflatable balloon (see FIG. 8), the piston 7a rigidly connected to the shearing diaphragm 6a through the medium of a washer 12a screwed thereto, is provided with a central internal protrusion 21. The closure 8a is formed by an outer wall 17a made of thin material and which engages over an external ridge, or the like, 18a of tube 5a and which is rigid with an extension piece 19a having an intermediate partition 22.

The decoy is accommodated between the piston 7a and the compartment provided in said extension piece 19a by the partition 22. The decoy comprises a case 23 which is forcibly mounted into the piston 7a and onto which is secured a diaphragm 24 in spaced relationship with the piston protrusion 21. This diaphragm bears a punch 25 adapted to perforate a disc 26 fitted into a compressed gas capsule 27 which is screwed into the case 23 through the medium of a bottom part 28 which is provided with holes 29 for placing the space bounded by diaphragm 24 in communication with the space external to capsule 27. The latter additionally comprises a valve 30 to enable it to be filled with compressed gas. Between the part 28 and the case 23 is clamped the extremity of a removable metallized balloon envelope 31 folded inside a jettisonable cover 32 which is rigid with the case 23 and bears against the partition 22.

Reference to FIG. 6 shows that the central chamber 4 is associated to an explosive device for setting it under pressure whereby to permit ejection of the decoys. This device comprises a tube 33 coaxial with the missile fore-aft axis and extending into the chamber 4 and which is additionally provided with openings 34 on its portion contained within said chamber. A piston 35 is slidable in said tube in response to an explosive charge 36 which is contained in a combustion chamber 37 embodied in the tube and which is detonated by an igniter 38. Positioned within the chamber 4 and at the extremity of tube 33 is a damper 39. The igniter 38 is electrically activated by a normally-open contact 40 placed between the warhead 2 and the missile casing 3 and inserted in the line supplying the igniter.

The device hereinbefore described operates as follows:

At blast-off, the pressurizing chamber 4 is at atmospheric pressure, the diaphragms 6 and 6a being calibrated to rupture at a given pressure. When the warhead 2 separates from the missile casing 3 at the point D along the trajectory shown in FIG. 1, the contact 40 closes, thereby activating the igniter 38 and detonating the charge 36. The small volume of the combustion chamber 37 and the conditions under which igniting takes place permit correct combustion of the grain at a pressure in the region of 427 p.s.i. The piston 35 is then driven forward through the cylinder 33 and, on reaching the end of its stroke, clears the holes 34 for setting the chamber 4 under pressure (see FIG. 6). The gases produced by the detonation enter the chamber 4 and create therein a sudden pressure rise whereby all the diaphragms 6, 6a are ruptured simultaneously.

Where the system is equipped with Luneberg lenses as shown in FIG. 7, as soon as the diaphragm 6 is sheared the piston 7 moves through the tube 5, driving before it both the lens 15 and the closure 8. By reason of the engagement of the captive studs 13 in the spiral riflings 9, this translation sets the piston 7 in rotation, which rotation is imparted to the Luneberg lens by the pegs 16. When the piston 7 reaches the end of its stroke, it is arrested by abutment of the guide studs 13 against the stops 10. This piston therefore seals off the tube 5 and prevents the gas from escaping until all the other ejection tubes in the system have operated.

Figure 2:
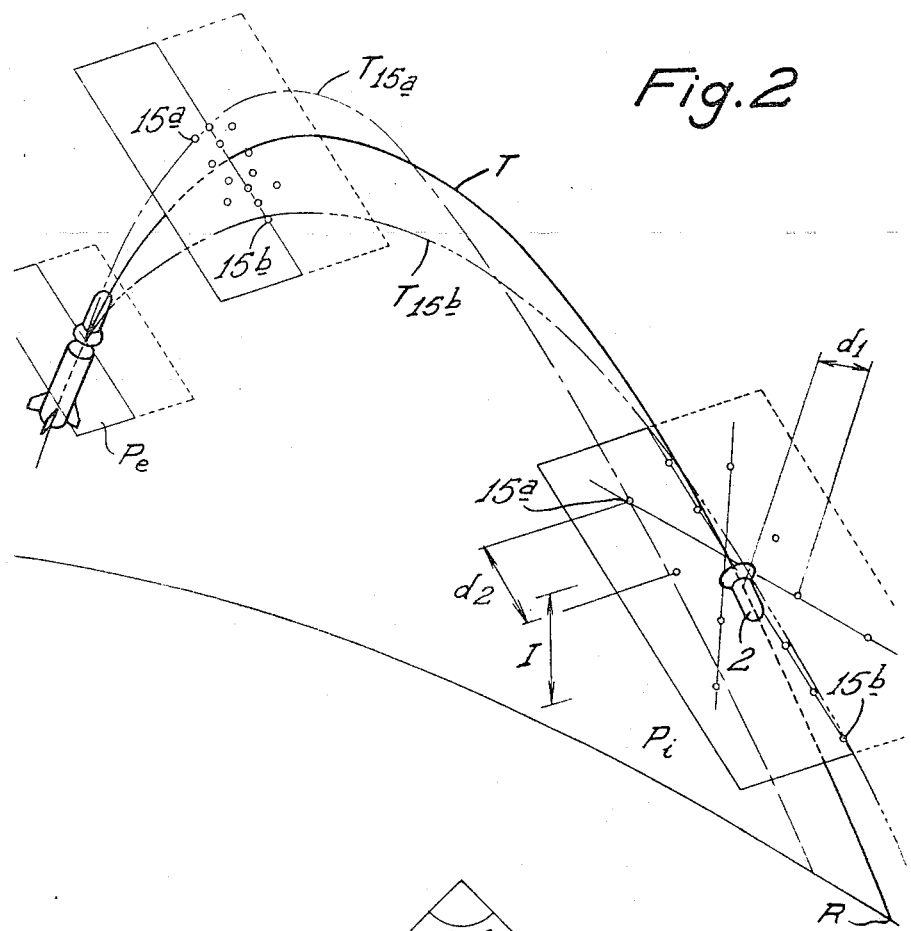
FIG. 2 is a representation of a portion of a trajectory similar to that of FIG. 1, in the case of an IRBM with separating warhead, showing the distribution of the decoys a short time after their ejection and at the instant of entry, simultaneously with the re-aimed warhead, into the interception zone, and the trajectories followed by a number of these decoys.
Figure 3:
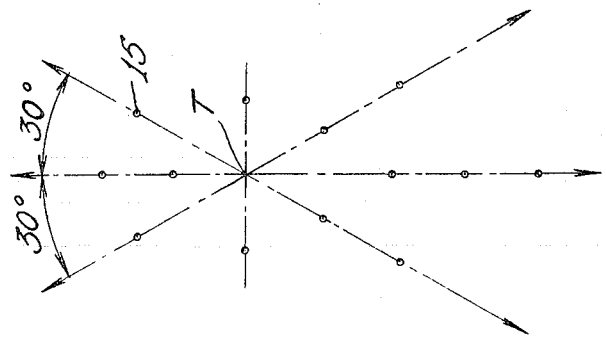
FIG. 3 shows a possible disposition of the decoys in the ejection plane.

Simultaneous ejection of all the Luneberg lenses 15 which are set spinning by their associated ejection piston takes place in a plane $P_e$ (see FIG. 2) which is substantially perpendicular to the warhead trajectory T, an example of the directions and relative positions of such decoys being shown in FIG. 3.

Due to the fact that, like the warhead 2, the decoys 15 cover the useful portion of their trajectories $T_{15a}$, $T_{15b}$ and T (FIG. 2) through a rarefied portion of the atmosphere, so that the relative drag effect they sustain is for all practical purposes negligible, they will be subjected only to the forces of gravity during this portion of their ballistic trajectory; indeed, in the case of the trajectory herein considered, involving a maximum range of 1800 km., a burn-out altitude of approximately 100 km. and a peak altitude of about 380 km., with interception taking place at altitudes above 40 km., the aerodynamic forces are negligible. In the case of a decoy having a diameter of 15 cm., as in the case of the Luneberg lens, the deceleration is $10^{-3}$ m./sec.$^2$ at an altitude of 42 km. and $10^{-7}$ m./sec.$^2$ at an altitude of 100 km. Since, moreover, the warhead and the decoys are adjacent in space, the acceleration of gravity operates on all of them with substantially the same effect and, since they are furthermore subjected to the same acceleration, their relative velocities will remain constant. In consequence, the ejection plane, which is substantially normal to the missile fore-aft axis and hence to the missile trajectory and velocity vector at the instant of ejection, will be translated in parallelism with itself and will accompany the warhead with all the decoys contained therein. Since, in the case of a trajectory covering the maximum range, the tangents thereto at burn-out and on entry into the interception zone I intersect substantially at right angles, the plane $P_e$ containing the decoys at the instant of burn-out will translate through space until it is virtually tangential to the trajectory T at the position $P_i$ at which it enters the interception zone.

In case it is desirable for the velocity characteristics of the decoys to remain comparable with those of the warhead down to lower altitudes, following re-entry into the atmosphere, the decoys may be weighted; this could result, say, in a Luneberg lens 15 cm. in diameter having a weight of 7 to 8 kg., the additional weight being made up of a ballast located behind the reflector and covering means for affording thermal protection.

The disposition of the decoys in FIG. 3, as it exists in the plane $P_e$ following ejection, is modified by a process of pseudo-geometrical similarity about the warhead, by reason of the differences in the direction and magnitude of the initial ejection velocities of the various decoys. These directions and speeds are so determined that if $r$ be the kill radius of the intercepting weapon, the distance $d_1$ between any decoy and the warhead 2 and the distance $d_2$ between any two decoys be at least equal to $2r$, or to at least 4 km., say. This distance, however, must remain close to the value $2r$ in order that the decoys may impact in the vicinity of the warhead, thereby preventing easy discrimination between the warhead and the decoys by the enemy defence.

Since the decoys have a radar-reflective area and reflected-wave-polarization and flicker characteristics equivalent to those of the warhead at the instant when the latter enters the interception zone I, the enemy defence is incapable of distinguishing between the images produced by the decoys and that produced by the warhead on the detection or tracking radar screen, as a result of which the chances of the warhead reaching the theoretical impact point R are significantly increased.

Considering now the case where the decoys consist of metallized inflatable balloons, as shown in FIG. 8, the gas entering the central chamber causes a pressure rise therein sufficient to shear the diaphragm 6a. The piston 7a is then hurled violently forward through the tube 5a and its central protrusion 21 strikes the middle of the diaphragm 24, causing the punch 25 to perforate the disc 26 on the capsule 27. The cover containing the balloon envelope is then translated forwardly through the piston 7a continuing to thrust against the bottom of capsule 27, which results in the closure 8a being likewise thrust forwardly.

When the driving imulse is spent, the assembly comprising the closure and the balloon envelop cover is ejected, while the piston 7a itself is arrested by the stops 10a provided in the tube 5a. The diaphragm 24 then sustains no further pressure, and its elasticity tends to restore it into its initial position. In doing so, it draws back the punch 25, which uncovers the hole made in the disc 26, this backward pull being in point of fact assisted by the high compressed gas filling the capsule 27. This compressed gas penetrates into the cavity 41 between the case and the diaphragh 24, causing the latter to deform outwardly. The gas then reaches the space comprised beneath the ejectable cover 32, through the communication holes 29, whereupon it expels said cover and fills the balloon envelope. The latter is thus unfolded and assumes its spherical utilization shape, as designated by reference numeral 42 in FIG. 9. The subsequent movements of the balloon decoys 42 are then similar to those described precedingly with reference to the Luneberg lenses.

Since the outside surrounding temperature at the instant of ejection is in the region of zero and remains so at the flight altitudes of the balloons 42, the final expansion pressure within the envelopes may be kept relatively low.

It should be noted that, after operating, the pistons 7, 7a for ejecting the decoys 15, 42 seal off their respective tubes. As a result, the pressure in chamber 4 cannot drop before the last decoy has been ejected, since the imulses applied to the various decoys, as well as the durations thereof, are different.

In addition, the fact that the contact 40 for setting the chamber 4 under pressure operates only after the warhead has begun to separate from the booster, precludes any possibility of the trajectory of the warhead being affected by ejection of the decoys. Indeed, the ejection of each decoy causes a turning moment to be applied to the rear end 3 of the missile, thereby causing the same to describe a relatively small slewing movement. However, since the decoys are ejected neither at the same time nor in the same direction relative to a given radius of the missile, it follows that the firing plane never remains in parallelism with itself from the beginning to the end of the ejection operations. The direction along which the decoys are ejected can therefore be corrected if required by presetting the ejection tubes 5, 5a with respect to the theoretical plane of ejection.

While there has been shown and described, the presently preferred embodiments of the apparatus for jamming radar detection of ballistic missiles, it will be well understood by those skilled in the art that various changes and modifications may be made in these embodiments within the scope of the invention as set forth in the appended claims.

What I claim is:

1. A ballistic missile radar detection and interception jamming apparatus comprising, in a missile having a warhead and a secton located aft of said warhead, in combintion, in said section, a tight central chamber, ejection tubes of different length and orientations, the axes of which are substantially orthogonal to that of the missile, which ejection tubes are disposed about said chamber while communicating therewith and extend through an external walling of said missile section, shearing diaphragms sealing said ejection tubes at their chamber ends, ejection pistons slidably mounted in said tubes and connected to said diaphragms respectively, closures obturating said tubes at their outer ends and flush with the outer surface of the missile, decoys housed within said tubes between said pistons and closures, means for pressurizing said central chamber in order to eject said decoys, and, within each tube, means for stopping and retaining its associated piston after ejection.

2. An apparatus according to claim 1, wherein the decoys are radar-wave-reflecting objects of relatively low weight and low volume.

3. An apparatus according to claim 1, wherein each decoy comprises an inflatable balloon disposed in a deflected and folded state between the corresponding ejection piston and closure, having an envelope the outer surface of which is metallized, such a balloon in the inflated condition having a diameter equal to about 1 m. and a weight substantially equal to 1.5 kg., and means for inflating said balloon when ejection takes place.

4. An apparatus according to claim 3, wherein the means for inflating the balloon comprises a capsule containing a compressed gas, means for mechanically connecting said capsule to the folded envelope of said balloon, and means sensitive to the pressure prevailing in the central chamber and inserted between said capsule and said envelope for placing said capsule in communication with the space bounded by said envelope when ejection takes place.

5. An apparatus according to claim 4, wherein the corresponding piston is formed with a central protrusion directed towards the outside of the missile, and wherein the means mechanically connecting the capsule to the envelope and the means sensitive to the pressure prevailing in the central chamber comprise a case mounted on said piston and within which the folded envelope is housed said case having a jettisonable cover and a bottom part retaining said envelope, disposed near said piston and provided with a central aperture through which the capsule is fitted and with holes communicating with the inside of said envelope, a disc closing a central aperture provided through the wall of said capsule facing said piston, a diaphragm located between said piston and said case and peripherally secured on said case while defining therewith a space communicating with said holes, and a punch centrally secured on said diaphragm and directed towards said disc.

6. An apparatus according to claim 1, wherein each decoy comprises a Luneberg lens having an electronically reflective hemispherical surface, a diameter equal to about 15 cm. and a weight substantially equal to 1.5 kg., and means for spinning said lens on ejection thereof.

7. An apparatus according to claim 6, wherein each tube is provided with spiral riflings on its inner surface, wherein each closure carries an inner extension piece the inward extremity of which is spherically surfaced and in contacting engagement with the Luneberg lens, and wherein the means for spinning said lens comprises outwardly projecting studs elastically mounted on the cylindrical wall of the corresponding ejection piston and engaging said spiral riflings, and means carried by said piston for causing local distortions of the lens the electronically reflective hemispherical surface of which bears on said piston and is centered upon the axis of the ejection tube.

8. An apparatus according to claim 1, wherein the decoy ejection velocity distribution is ensured vectorially by the orientation of said tubes and in magnitude by the distance along which said pistons are guided in said tubes.

9. An apparatus according to claim 1, wherein the means for pressurizing the central chamber comprises a pressurizing tube coaxial with the missile fore-aft axis, extending into said central chamber and provided with openings on its portion contained within said chamber, a piston slidable in said pressurizing tube and initially disposed in its portion outside said chamber, an explosive device carried by the outer end of said pressurizing tube and means for inducing the explosion of said explosive device.

10. An apparatus according to claim 9, wherein the explosive device is electrically operated, and wherein the means for inducing the explosion of said explosive device comprises a contact inserted in the electrical line supplying said explosive device and located in a normally-open position between the warhead and the missile casing.

References Cited by the Examiner
UNITED STATES PATENTS 3,019,432   1/1962   Johnson _____ 343—18
3,150,363   9/1964   Finvold _____ 343—5

OTHER REFERENCES

Blattner, D. J., Electronic Countermeasures, in Electronics World, 62(6), pp. 47–49, 126, December 1959.

CHESTER L. JUSTUS, *Primary Examiner.*

G. M. FISHER, *Assistant Examiner.*